(12) United States Patent
Etling

(10) Patent No.: US 8,568,054 B2
(45) Date of Patent: *Oct. 29, 2013

(54) ATTACHMENT SYSTEM FOR THERMAL PROTECTION SYSTEM

(75) Inventor: Keith A. Etling, Shiloh, IL (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,761

(22) Filed: Jun. 25, 2012

(65) Prior Publication Data

US 2012/0275845 A1 Nov. 1, 2012

Related U.S. Application Data

(62) Division of application No. 12/184,831, filed on Aug. 1, 2008, now Pat. No. 8,291,594.

(51) Int. Cl.
*B25G 3/08* (2006.01)

(52) U.S. Cl.
USPC .............................. 403/63; 403/28; 403/381

(58) Field of Classification Search
USPC ............................ 403/28–30, 53, 63, 331, 381
See application file for complete search history.

(56) References Cited

U.S. PATENT DOCUMENTS

| | | | |
|---|---|---|---|
| 3,504,470 A * | 4/1970 | Pincemin ........................ 52/385 |
| 4,308,309 A | 12/1981 | Frosch et al. |
| 4,344,591 A | 8/1982 | Jackson |
| 4,441,726 A | 4/1984 | Uhl |
| 4,452,592 A * | 6/1984 | Tsai ............................ 464/102 |
| 4,520,601 A * | 6/1985 | Stacey, Jr. ..................... 52/127.7 |
| 4,675,223 A | 6/1987 | Trummer |
| 4,919,558 A * | 4/1990 | Mascitelli et al. ................ 403/9 |
| 5,022,645 A * | 6/1991 | Green ........................... 271/276 |
| 5,236,151 A * | 8/1993 | Hagle et al. ............... 244/117 A |
| 5,545,273 A | 8/1996 | Rasky et al. |
| 5,658,352 A * | 8/1997 | Draenert ...................... 623/22.4 |
| 5,800,565 A * | 9/1998 | Biedermann .................... 623/38 |
| 6,299,106 B1 * | 10/2001 | Shorey ....................... 244/171.7 |
| 6,699,555 B2 | 3/2004 | DiChiara, Jr. |
| 6,827,312 B2 * | 12/2004 | Riedell ........................ 244/159.1 |
| 7,090,700 B2 * | 8/2006 | Curtis ............................. 623/38 |
| 7,104,717 B2 * | 9/2006 | Arheart ........................... 403/53 |
| 8,056,862 B1 * | 11/2011 | Tomerlin et al. ........... 244/159.1 |
| 2005/0267600 A1 * | 12/2005 | Haberman et al. ............. 623/38 |

FOREIGN PATENT DOCUMENTS

GB 2309047 7/1997

OTHER PUBLICATIONS

US Centennial Flight Comission, "Shuttle Thermal Protection System (TPS)", Jan. 1981.
Boeing Frontiers, "Boeing provides data, work to NASA for safe Space Shuttle re-entry" Oct. 2005.
NASA Facts, "Orbiter Thermal Protection System" Mar. 1997.
UK Search Report for Application No. GB0912505.5.

* cited by examiner

*Primary Examiner* — Joshua Kennedy

(57) ABSTRACT

An attachment system for mounting a tile of a thermal protection system to a substructure includes a post assembly configured to interconnect the tile to the substructure. The post assembly may allow relative sliding movement between the tile and the substructure along a plane which is generally parallel to the tile. The attachment system facilitates installation and removal of the tile from the substructure for inspection, maintenance, and repair of the tile and/or the substructure.

15 Claims, 11 Drawing Sheets

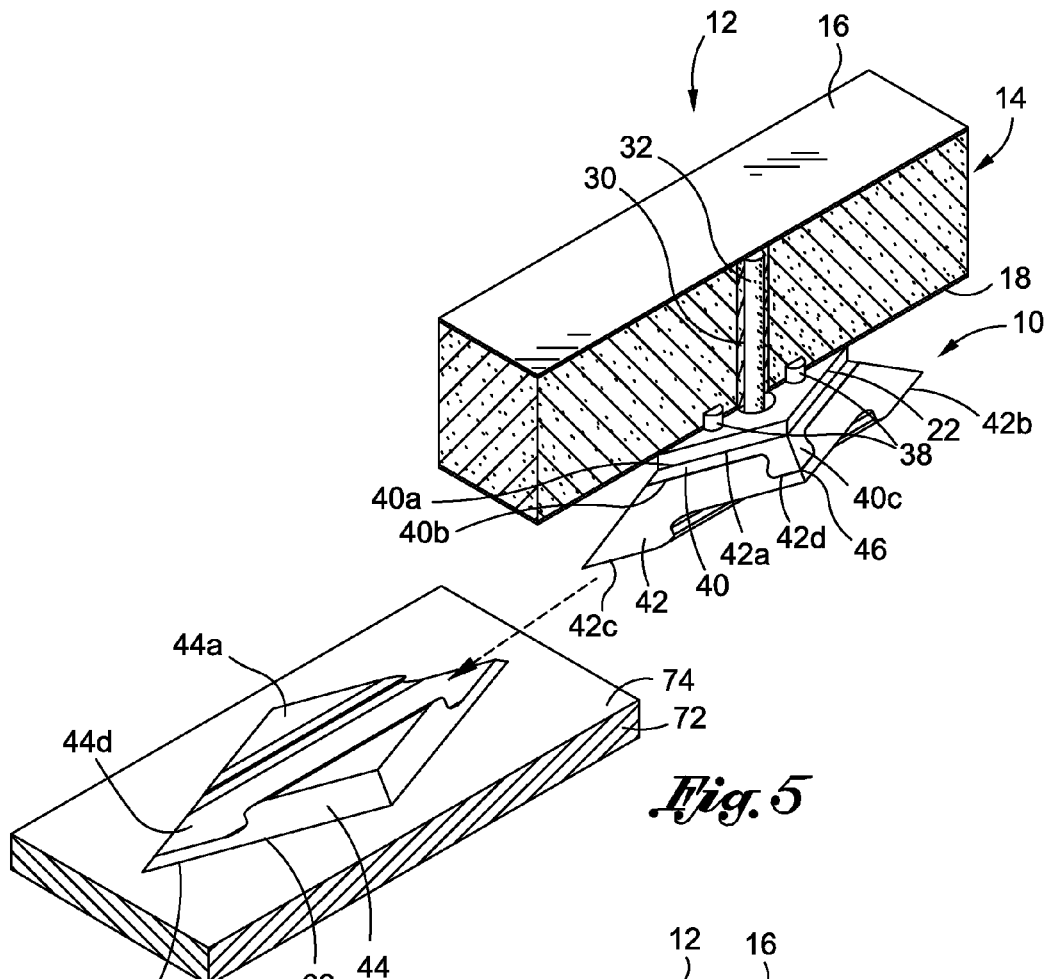
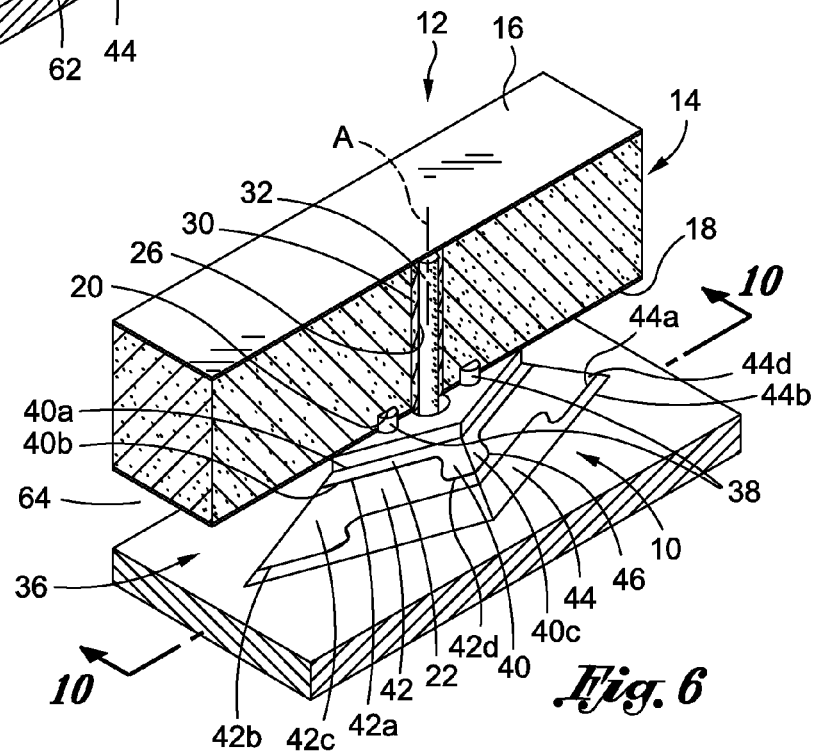

ATTACHMENT SYSTEM FOR THERMAL PROTECTION SYSTEM

CROSS-REFERENCE TO RELATED APPLICATIONS

The present application is a divisional application of and claims priority to pending U.S. application Ser. No. 12/184,831 filed on Aug. 1, 2008 and entitled ATTACHMENT SYSTEM AND METHOD FOR THERMAL PROTECTION SYSTEM, the entire contents of which is expressly incorporated by reference herein.

FIELD

The present disclosure relates generally to thermal protection systems (TPS) and, more particularly, to a uniquely configured attachment system for mechanically attaching individual tiles to a substructure.

BACKGROUND

Thermal protection systems (TPS) are widely used on reusable launch vehicles (RLV's) such as the Space Shuttle to provide a thermal shield against the very high temperatures of vehicle re-entry into the Earth's atmosphere. TPS may additionally be required on certain air vehicles such as hypersonic vehicles intended primarily for atmospheric flight. For example, TPS may be applied to portions of the air vehicle that are downstream of jet engine exhaust or rocket engine exhaust. Such air vehicles may include fixed structure or control surfaces that are located within the exhaust plume and which are therefore subjected to the extreme heat of such exhaust.

Future air and space vehicles to which TPS may be applied include crew exploration vehicles (CEV's) which may utilize modular architecture to transfer crew and cargo to the International Space Station and to destinations beyond. Other vehicles utilizing TPS may include vehicles having advanced air-breathing stages as well as supersonic air launch platforms combining air-breathing and rocket stages for transatmospheric or orbital missions.

As applied to RLV's, TPS must be capable of surviving extreme temperatures ranging from −300° F. on orbit to up to 3,000° F. upon re-entry into the Earth's atmosphere. Regarding its thermally insulative capabilities, TPS must be capable of maintaining the temperature of metallic or composite substructure below the temperature at which the mechanical properties of the substructure may begin to degrade. In addition to protecting the vehicle substructure against extreme temperatures, TPS must also accommodate flight-induced deflections of the vehicle substructure. For example, TPS must be capable of adjusting to relative movement of the substructure under high strain conditions of wing bending. In this regard, the attachment of TPS to the substructure must be of sufficient flexibility under high structural strain.

Prior art TPS for re-entry vehicles such as the Space Shuttle comprise a large number of insulative tiles formulated and/or sized for a variety of substructure material compositions. The tiles are positioned at strategic locations on the vehicle dependent upon the temperatures occurring at those locations. Current attachment technology for mounting TPS tiles to a substructure includes adhesive bonding. In one prior art attachment system, tiles may be first bonded to a strain isolation pad (SIP) which may be comprised of felt-like material. The SIP allows the tile to withstand flexing of the vehicle substructure under load. The SIP may also accommodate thermal growth of the tile and may compensate for acoustic excitation (i.e., vibration) during ascent to orbit. Following bonding to the tile, the SIP may be bonded to the substructure using a thin layer of silicone adhesive.

Although prior art systems for attaching TPS are generally effective for their intended purposes, they possess certain drawbacks which detract from their overall utility. More specifically, the installation of tiles using current attachment technology is extremely labor intensive and time-consuming. For example, high-temperature reusable surface insulation (HRSI) tiles are mounted on upper forward fuselage areas of the Space Shuttle and around certain portions of orbital maneuvering systems (OMS) and reaction control system (RCS) pods of the Shuttle.

The HRSI tiles are first bonded to an SIP which, in turn, is bonded to the Space Shuttle substructure using room temperature vulcanization (RTV) silicone adhesive. The RTV adhesive is applied to the substructure in thin layers of less than 0.010 inch. During the curing process, the tile/SIP may be forced against the substructure under pressure using a vacuum bag which is sealed against the substructure to enclose an area where the tiles are to be bonded. Replacement of the tile includes removal of old RTV followed by surface preparation of the substructure and then bonding and curing of a new tile element using the process described above. The total process is rather lengthy and can entail a significant amount of touch labor and vehicle down time.

A further drawback associated with current attachment technology for TPS tiles is that the RTV silicone bond line is limited to 500° F. continuous operation temperature. Unfortunately, this temperature limitation necessitates the use of extremely expensive polyimide structures directly under the TPS tiles in order to withstand the 500° F. operation temperature. An additional drawback associated with current attachment technology is related to the inability to inspect the silicone bond line after a tile is installed in order to verify bond quality. Also, current attachment technology of TPS tiles prevents quick access to underlying subsystems and structure for inspection, maintenance and servicing.

In order to improve the feasibility of hypersonic aircraft and future space vehicles, it is necessary to reduce the cost and time required to install TPS on such vehicles and to reduce the time required to inspect, remove, repair and replace tiles and underlying substructure. As can be seen, there exists a need in the art for an attachment system for TPS which facilitates rapid inspection of installed tiles and which allows for rapid access to underlying subsystems and structure for maintenance and inspection. Additionally, there exists a need in the art for an attachment system for TPS which allows for rapid replacement of damaged tiles and which facilitates relative movement between the tiles and substructure at operating temperatures in order to prevent failure of the connection between the tile and the substructure.

Furthermore, there exists a need in the art for an attachment system for TPS which allows for the use of low cost, low operating-temperature epoxy composite structures under the TPS in certain locations as opposed to the more expensive polyimide structures currently required to handle the 500° F. operating temperatures. In this regard, there exists a need in the art for an attachment technology for TPS which provides a relatively large cooling channel between the tile and the exterior of the substructure (i.e., air vehicle or space vehicle) skin in order to improve cooling capacity and permit operation at much higher temperatures. Finally, there exists a need in the art for an attachment system for TPS which reduces vehicle down time to repair or replace a damaged tile.

BRIEF SUMMARY

The above described needs associated with thermal protection systems (TPS) are specifically addressed and alleviated by the various embodiments disclosed herein. More specifically, a mechanical attachment system is provided for removably mounting a tile of a thermal protection system to a vehicle substructure. The attachment system includes at least one post assembly for mounting at least one tile in spaced relation to a substructure such that a cooling gap is formed between the tile and the substructure. The post assembly is specifically configured to facilitate sliding movement of the tile relative to the substructure along a plane that is generally parallel to the tile for structural advantages.

The technical effects of the embodiments disclosed herein include the ability to facilitate relative sliding movement between the tile and the substructure in at least one of first and second sliding directions wherein the first sliding direction is preferably, but optionally, perpendicular to the second sliding direction. In addition, the post assembly is sized and configured to locate the installed tiles in spaced relation to the substructure to provide a channel for the flow of cooling air to increase operating temperatures.

In one embodiment, the attachment system comprises the post assembly to removably secure the tile to the substructure. The post assembly may comprise a lower element, a center element and an upper element. The lower element may be fixedly mountable to the substructure such as by bonding with a suitable film adhesive such as silicone or polyimide adhesive or other high-temperature adhesive. The center element may be slidably engageable to the lower element. The upper element may be fixedly mountable to the tile and may be slidably engageable to the center element. In this regard, the upper element is preferably slidable relative to the center element along the first sliding direction. The center element is preferably slidable relative to the lower element along the second sliding direction.

However, it is contemplated that the post assembly may be configured to facilitate relative movement in a plane generally parallel to the tile but in only a single sliding direction or in three or more sliding directions. In addition, the post assembly may be configured to facilitate relative movement in sliding directions that are oriented in non-perpendicular relationship to one another. For example, it is contemplated that the post assembly may be configured to allow for relative sliding movement along first, second and third sliding directions which are each oriented at 60 degree angles relative to one another.

The attachment system may comprise a strain isolation pad (SIP) which is preferably disposed between the post assembly and the tile in order to allow the tile to move slightly relative to the substructure without compromising the strength of the joint therebetween. The SIP may also isolate the tile from structural deflections of the vehicle as well as from thermal expansion and acoustic excitation as a means to reduce stress in the tile.

The attachment system may comprise an interlocking mechanism such as, without limitation, a tongue and groove arrangement disposed between at least one of the upper, center and lower elements. For example, the center element may include at least one longitudinally-extending tongue disposed on a lower side of the center element. A longitudinally-extending groove may be formed along an upper side of the upper element with the tongue and the groove of the center element being oriented in perpendicular arrangement relative to one another. A corresponding tongue may be formed on a lower side of the upper element with a corresponding groove being formed on an upper side of the lower element in order to slidably engage the corresponding tongue and groove formed on the respective lower and upper sides of the center element.

In a preferable embodiment, the tongue and groove arrangements on the upper, center and lower elements are preferably provided with a dovetail configuration when viewed in transverse cross-section in order to prevent relative movement along a direction generally parallel to a post axis (i.e., along a vertical axis of the post assembly).

Load transfer in the vertical direction between the tile and the post assembly may be facilitated through the use of at least one rope or a cord element such as a cord fabricated of a suitable material such as Nextel, Nomex, silica or fiberglass. It may be desirable to use multiple cords for each post assembly for increased vertical load transfer capability. The cord preferably extends substantially parallel to the post axis and interconnects the tile to the post assembly and thereby transfers vertical loads. The cord preferably extends through a pair of bores in the tile which are interconnected by a lateral groove formed just beneath an upper side of the tile such that the cord forms a U-shaped loop, the lower ends of which may be bonded to the upper element but the cords being unbonded to the tile or the strain isolation pad. In a further embodiment, the cord may be formed as a single strand extending through a single bore in the tile with the cord being bonded to the tile and the upper element such that the strain isolation pad allows the tile to be at least partially free-floating relative to the upper element.

Angular alignment (i.e., clocking) of the tile to the post assembly may be facilitated through the use of a pair of prongs extending upwardly from an upper side of the upper element. A corresponding pair of counterbores may be formed in the lower surface of the tile to receive the prongs. For embodiments of the attachment system that include the SIP, the prongs may extend through a complimentary set of apertures formed therein. Clocking of the tile relative to the post assembly may be desirable for configurations where the post assembly includes an outer geometry that must be aligned with the vehicle for certain purposes such as for reduced radar reflectivity. The prongs may also facilitate lateral load transfer between the post assembly and the tile.

Regarding the connection between the upper element and the tile, a cord may extend through a single bore or through a pair of bores formed in the tile and through bores formed in the SIP and the upper element. The cord in looped arrangement may be left unbonded to the tile although the lower ends of the looped cord may be bonded to a pair of bore formed in the upper element. If provided as a single strand, the cord may be bonded to the tile via the use of an appropriate potting compound such as a ceramic slurry or other suitable adhesive or potting compound. The potting compound may be fired at an appropriate elevated temperature. Following curing of the potting compound, the SIP and the upper element may be slipped over the cord.

The cord(s) may then be tensioned and a suitable potting compound may be installed in the annular gap between the cord and the upper element. The potting compound between the upper element and the cord may be a microballoon-filled resin which may be oven-cured while the cord is under tension such that the SIP is snugly sandwiched between the upper element and the tile. After curing, an excess portion of the cord(s) extending out of the upper element may then be trimmed such that the cord(s) terminates inward of the lower side of the upper element to avoid interfering with the free sliding of the tongue of the lower element inside the groove of the center element.

The prongs of the upper element (which extend into the counterbores of the tile) may facilitate lateral load transfer between the tile and the post assembly while the cord may facilitate vertical load transfer between the tile and the post assembly. Following assembly of the upper element to the tile, the center element may be slidably engaged to the upper element and the center element may be slidably engaged to the lower element. The lower element may then be bonded to the substructure using an appropriate film adhesive.

The advantages provided by the attachment system as disclosed above include the ability to rapidly install and remove TPS from an air or space vehicle or other vehicle for inspection, maintenance and repair of the substructure and/or subsystems underlying the TPS. A further advantage provided by the attachment system includes the ability to rapidly inspect, repair and replace tiles that may be damaged.

The mounting of the tile in spaced relation to the substructure via the post assembly also facilitates the flow of cooling air through the cooling gap that is provided therebetween. The cooling gap improves cooling capacity and permits operation of the vehicle at much higher temperatures. Furthermore, the cooling gap may permit the use of lower cost and lower temperature epoxy composite structures as a substitute for the relatively expensive polyimide structures required in vehicles using prior art attachment systems. In this regard, the attachment system provides a survivable solution for controlling extreme temperatures generated by high thrust or afterburning engines.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is a perspective cutaway view of one of the post assemblies illustrating the engagement of a center element of the post assembly to the lower element mounted to the substructure;

FIG. 6 is a perspective cutaway illustration of the tile slidably engaged to the substructure via the post assembly;

DETAILED DESCRIPTION

Figure 1:
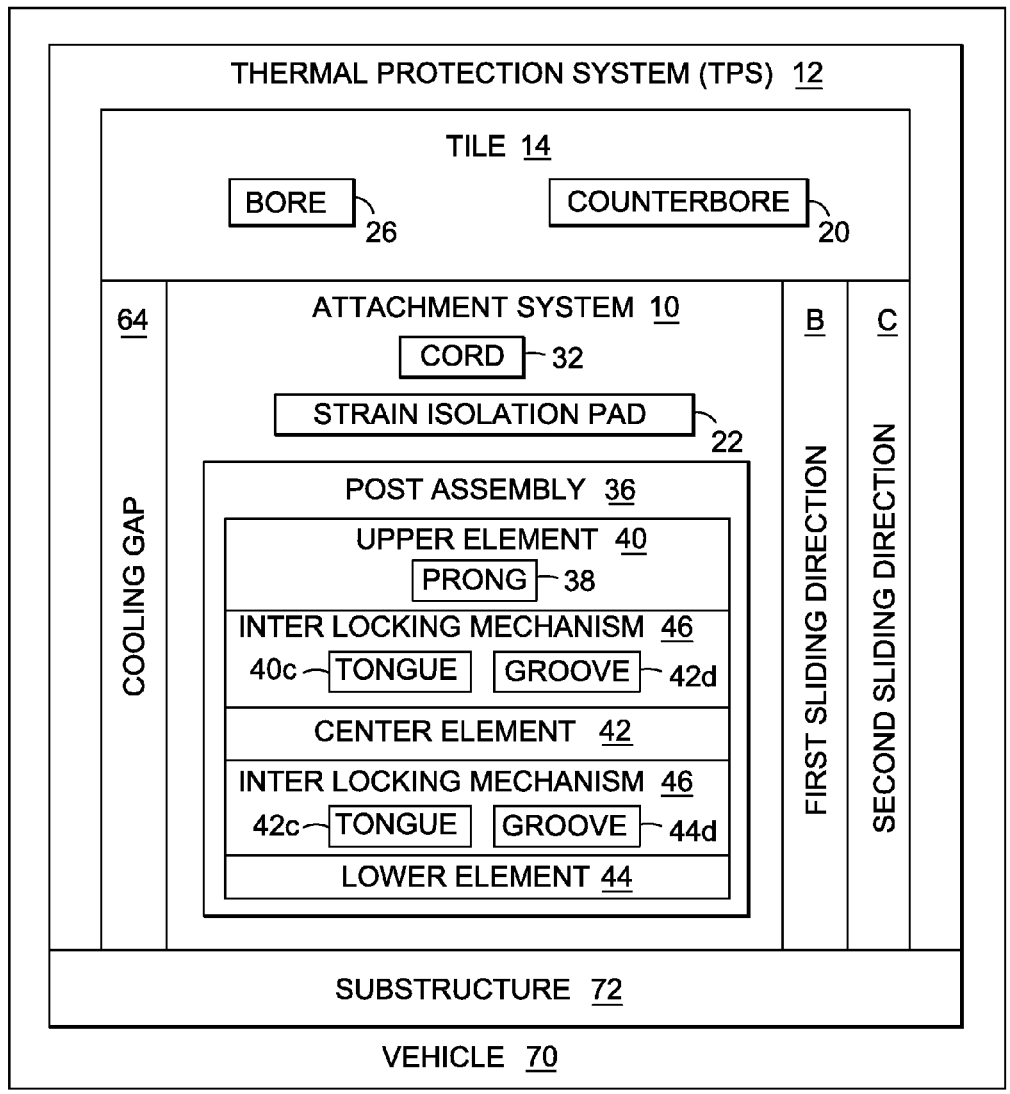
FIG. 1 is a diagram illustrating an attachment system in accordance with an advantageous embodiment.

Referring now to the drawings wherein the showings are for purposes of illustrating preferred and various embodiments of the disclosure only and not for purposes of limiting the same, FIG. 1 is a diagram illustrating a mechanical attachment system 10 for mounting at least one tile 14 such as a tile 14 of a thermal protection system 12 (TPS) to a vehicle 70 substructure 72 in accordance with an advantageous embodiment. The attachment system 10 may include at least one post assembly 36 for removably mounting at least one tile 14 in spaced relation to the vehicle 70 substructure 72 such that a cooling gap 64 may be formed between the tile 14 and the substructure 72. The cooling gap 64 may provide a channel for the flow of cooling air therebetween in order to improve cooling capacity and/or to increase the temperatures at which the vehicle 70 substructure 72 may operate. The post assembly 36 may be configured to facilitate sliding movement of the tile 14 relative to the vehicle 70 substructure 72 along a plane that may be oriented generally parallel to the tile 14. The sliding movement of the tile 14 relative to the substructure 72 may improve the mechanical attachment therebetween.

The vehicle 70 may be, without limitation, any type of vehicle including an air vehicle such as an aircraft intended for atmospheric flight or a hypersonic vehicle or a space vehicle such as a reusable launch vehicle (RLV) or a crew exploration vehicle (CEV). Other vehicles 70 utilizing the attachment system 10 may include, without limitation, vehicles having advanced air-breathing stages as well as supersonic air launch platforms combining air-breathing and rocket stages for transatmospheric or orbital missions. However, the vehicle 70 may also comprise, without limitation, any air vehicle, space vehicle, land vehicle, stationary structure or immovable object such as a building structure or stationary apparatus such as machinery.

In one embodiment, the tile 14 may be applied to portions of an air vehicle that are downstream of high temperature exhaust such as jet engine exhaust or rocket engine exhaust. In another embodiment, the tile 14 may be applied to portions of a vehicle that may be capable of withstanding high operating temperatures as may be induced by atmospheric heating or radiative heating. The tile 14 may also be configured as a non-TPS element wherein relative movement between the tile 14 and the substructure 72 is desirable. For example, the tile 14 may be configured as a panel element for any application wherein relative movement between the tile 14 and the substructure 72 is desired and wherein the tile 14 may be easily removed and replaced or reinstalled such as for inspection, repair, and/or replacement of the tile 14 or to facilitate inspection, repair and/or replacement of the substructure 72.

The post assembly 36 may be configured to facilitate relative sliding movement between the tile 14 and the substructure 72 in one or more sliding directions. The sliding directions may be generally parallel to a plane defined by the tile 14 and/or by the substructure 72. In an exemplary embodiment, the post assembly 36 may be configured to facilitate sliding movement in first and second sliding directions B, C wherein the first sliding direction B is preferably, but optionally, oriented perpendicular to the second sliding direction C. However, the post assembly 36 may be configured to facilitate relative movement in sliding directions that may be oriented in non-perpendicular relationship to one another.

The attachment system 10 may optionally include a strain isolation pad 22 (SIP) which may be disposed between the post assembly 36 and the tile 14. The SIP 22 may be configured to facilitate slight vertical and/or horizontal movement of the tile 14 relative to the substructure 72 without compromising the strength of the joint therebetween. For example, the SIP 22 may facilitate slight vertical movement of the tile 14 relative to the substructure 72. In this regard, the SIP 22 may be configured to isolate the tile 14 from structural deflections of the vehicle 70 such as may occur under static and/or dynamic loading such as, without limitation, a result of air frame-induced load deformations. In addition, the SIP 22 may be configured to isolate the tile 14 from relative movement as a result of thermal expansion and/or acoustic excitation in order to prevent stress failure in the tile 14.

The SIP 22 may be comprised of any suitable material and may be formed of felt-like material preferably having high-temperature operational capabilities. For example, in one embodiment, the SIP 22 may be fabricated of Nextel ceramic fiber pad material or any other suitable flexible material that facilitates movement of the tile 14 relative to the substructure 72 without compromising the strength of the joint therebetween.

The post assembly 36 may comprise one or more elements which may be configured to facilitate the relative sliding movement between the tile 14 and the substructure 72. For example, in one embodiment, the post assembly 36 may comprise a lower element 44, a center element 42 and an upper element 40 although the post assembly 36 may comprise any number of elements. The lower element 44 may be fixedly mounted to the substructure 72 such as by bonding with a suitable adhesive and/or by mechanically connecting the lower element 44 to the substructure 72.

The center element 42 may be slidably engageable to the lower element 44 such that the center element 42 may move relative to the lower element 44 along a direction that is generally parallel to the tile 14 and/or the substructure 72. In one embodiment, the center element 42 may be configured to be slidable relative to the lower element 44 along the first sliding direction B. The center element 42 may also be slidably engageable to the lower element 44 such that relative vertical movement therebetween is prevented.

The upper element 40 may be fixedly mountable to the SIP 22. However, the upper element 40 may optionally be fixedly mountable directly to the tile 14 if the SIP 22 is omitted from the attachment system 10. The upper element 40 is preferably configured to be slidably engageable to the center element 42. In one embodiment, the upper element 40 may be configured to be slidable relative to the center element 42 along the second sliding direction C. The upper element 40 may also be slidably engageable to the center element 42 such that relative vertical movement therebetween is prevented.

The attachment system 10 may include an interlocking mechanism 46 between any one of the adjacently-disposed elements. For example, an interlocking mechanism 46 may be provided between the lower element 44 and the center element 42. Likewise, an interlocking mechanism 46 may be provided between the center element 42 and the upper element 40. The interlocking mechanism 46 may be configured to facilitate slidable engagement of adjacently-disposed elements with one another. Furthermore, the interlocking mechanism 46 may facilitate relative sliding movement between adjacently-disposed elements such as between the lower element 44 and the center element 42 and between the center element 42 and the upper element 40.

In an advantageous embodiment, the interlocking mechanism 46 may comprise a longitudinally-extending tongue 42c disposed on the center element 42 and a longitudinally-extending mating groove 44d disposed on the lower element 44. Likewise, a longitudinally-extending tongue 40c may be disposed on the upper element 40 and a longitudinally-extending mating groove 42d disposed on the center element 42. The tongues 40c, 42c and respective grooves 42d, 44d may be configured to be slidably engageable to one another.

The attachment system 10 may include at least one rope or cord 32 extending between the post assembly 36 and the tile 14 as a means to facilitate vertical load transfer therebetween. The cord 32 may be oriented substantially perpendicularly relative to the tile 14 and may be mechanically attached to the tile 14 without adhesive although the cord 32 may be bonded to the tile 14 and/or post assembly 36. The cord 32 may be bonded to a bore 26 formed in the tile 14. The cord 32 may extend through the SIP 22 which may be captured between the post assembly 36 and the tile 14. In this regard, the SIP 22 allows the tile 14 to be at least partially free-floating relative to the upper element 40 while allowing the cord 32 to transfer vertical loads between the substructure 72 and the tile 14.

The upper element 40 may include at least one prong 38 extending upwardly therefrom and being engageable to the tile 14. In an advantageous embodiment, a pair of prongs 38 may be provided and may engage a corresponding pair of counterbores 20 optionally formed in the tile 14 to facilitate angular alignment of the tile 14 to the post assembly 36. The prongs 38 may also be configured to facilitate lateral load transfer between the tile 14 and the post assembly 36 while the cord 32 may facilitate vertical load transfer between the tile 14 and the post assembly 36 as described above.

Figure 2:
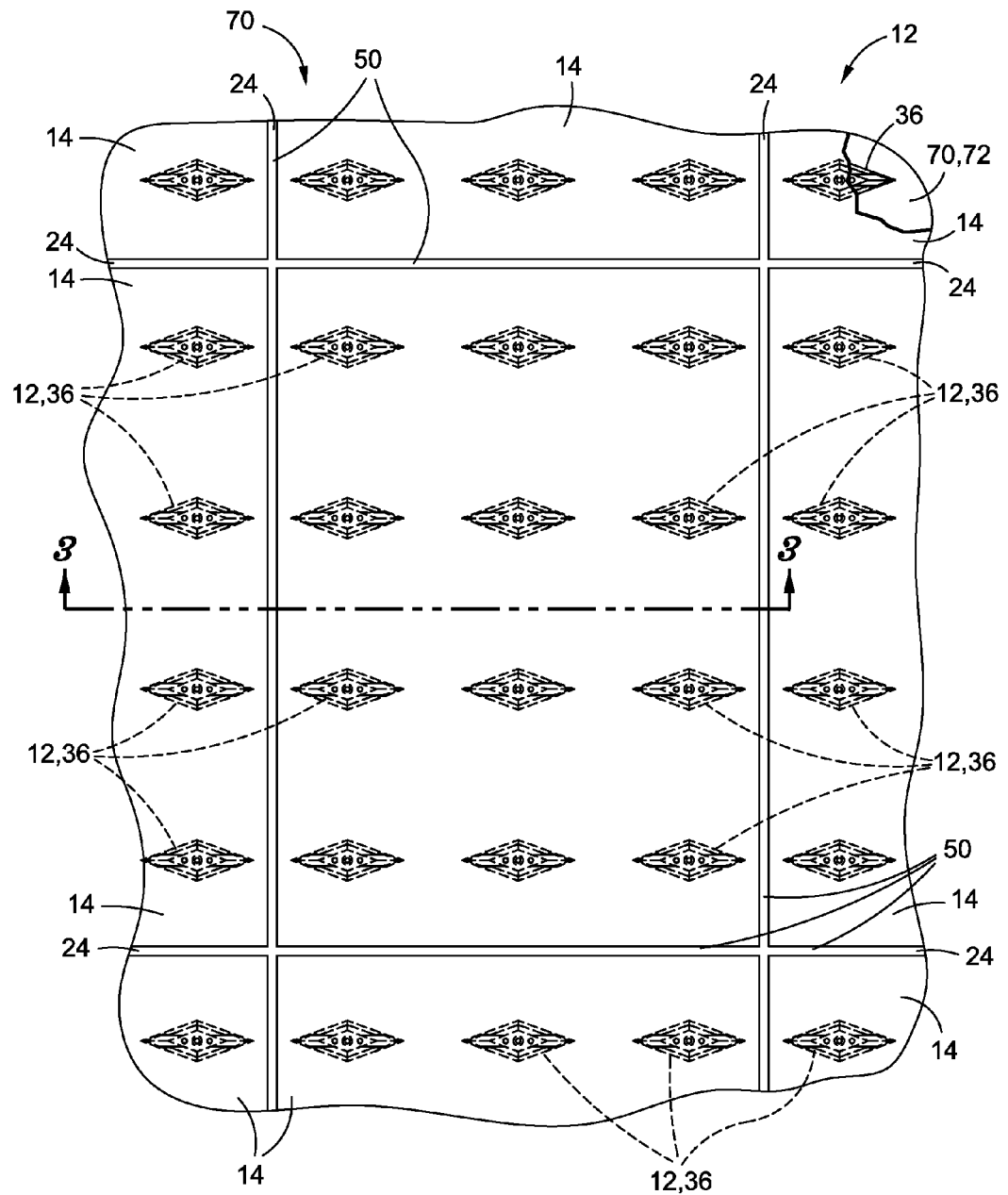
FIG. 2 is a plan view of the attachment system in one embodiment comprising a plurality of adjacently disposed tiles removably mounted to a vehicle substructure utilizing a plurality of post assemblies.

FIG. 2 is an illustration in plan view of a thermal protection system (TPS) 12 comprising a plurality of tiles 14 mounted to a vehicle 70. More specifically, FIG. 2 illustrates an arrangement of tiles 14 mounted to the substructure 72 such as of an air vehicle or a space vehicle. FIG. 2 also illustrates a plurality of attachment systems 10 for mounting the tiles 14 to the substructure 72 wherein the attachment systems 10, in one embodiment, may comprise at least one post assembly 36 configured to secure at least one tile 14 to the substructure 72.

As shown in FIG. 2, a plurality of the post assemblies 36 may be employed to mount a single one of the tiles 14 to the vehicle 70 substructure 72. However, any number of the post assemblies 36 including a single one of the post assemblies 36 may be utilized for mounting the tile 14 to the substructure 72. In this regard, the tile 14 may comprise a variety of different components including, but not limited to, any thermal protection system 12 to be removably mounted to the substructure 72.

The tiles 14 may comprise rigid, flexible and/or semi-flexible tiles 14 which may be fabricated of a variety of materials. For example, the tiles 14 may comprise ceramic tiles 14 for use on a reusable launch vehicle (RLV). Furthermore, the post assembly 36 may be employed for attaching any type of structure other than TPS 12 elements to the substructure 72. For example, the post assembly 36 may be employed for slidably securing various system components to the substructure 72 wherein lateral movement (i.e., movement along or parallel to the plane of the substructure 72) is desired.

Figure 3:
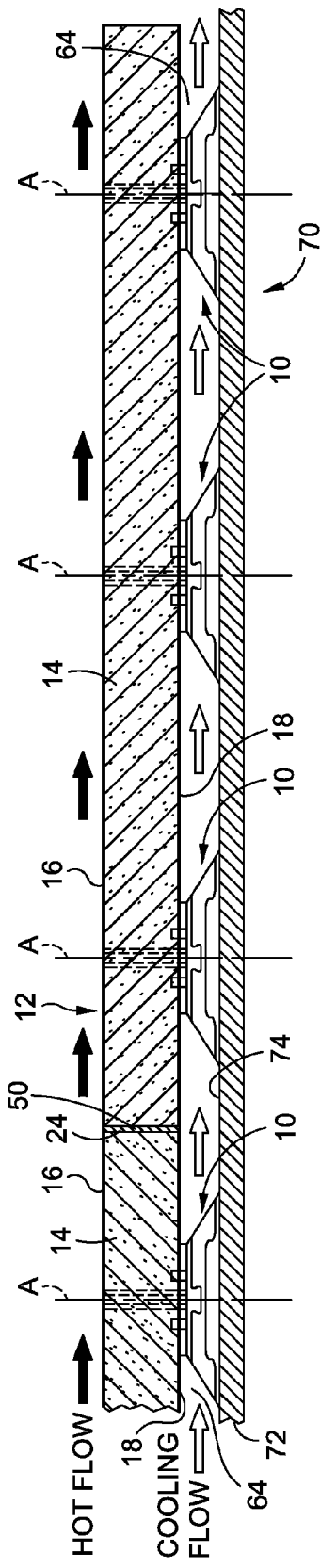
FIG. 3 is a sectional illustration taken along line 3-3 of FIG. 2 and illustrating the mounting of the tiles in spaced relation to the substructure of the vehicle utilizing the plurality of post assemblies.
Figure 4:
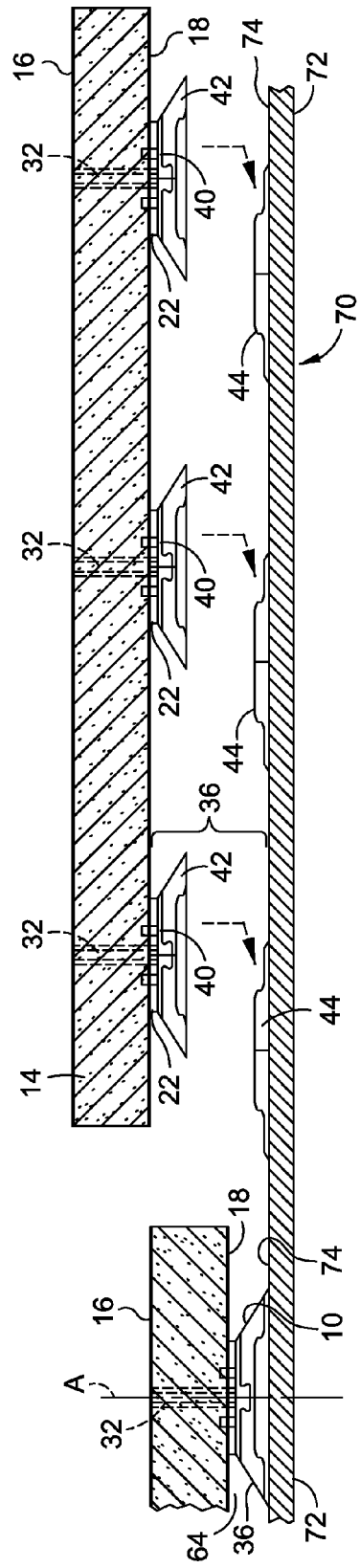
FIG. 4 is a sectional view illustrating the engagement of one of the tiles to the substructure by engagement of upper and center elements mounted to the tile to corresponding lower elements mounted to the substructure.

Referring to FIGS. 2-4, the tiles 14 are shown as having a generally orthogonal or rectangular shape although the tiles 14 may be provided in any shape, size and configuration. In addition, FIGS. 2-3 show the tiles 14 as being generally disposed in slightly spaced relationship such that a gap 50 may be formed between adjacently disposed tiles 14. The gap 50 between the tiles may facilitate thermal expansion or contraction of the substructure 72. As such, the tiles 14 may be provided or arranged in slightly spaced relationship relative to one another to prevent tile-to-tile 14 contact therebetween during thermal expansion or contraction of the substructure 72.

The side-to-side gap 50 allowance between the tiles 14 may also compensate for assembly tolerances of the tiles 14 relative to the substructure 72 and/or machining tolerances of the tiles 14. Each of the gaps 50 between the adjacent tiles 14 is preferably filled with a TPS seal 24 which may be formed of a suitable material such as Nextel padding or other filler bar materials to facilitate waterproofing and temperature resistance but allowing relative movement between the tiles 14 as may occur during the dynamic loading conditions of vehicle flight.

Regarding the spacing of the post assemblies 36, FIG. 2 illustrates a spacing of approximately 4 inches to 6 inches on centers between adjacent post assemblies 36 for an exemplary 2 foot by 2 foot tile 14. However, it should be noted that spacings of the post assemblies 36 may be provided in any suitable arrangement in order to secure the tile 14 assembly to the substructure 72 while allowing little relative axial movement between the supported portions of the tile 14 and the substructure 72.

Referring particularly now to FIGS. 3 and 4, shown is the thermal protection system 12 wherein the tiles 14 are disposed in spaced relationship to the substructure skin 74. In this regard, the post assemblies 36 advantageously facilitate the flow of cooling air between the tile 14 and the substructure 72 as may be desirable on certain applications in order to improve cooling capacity and permit operation at much higher temperatures. In this regard, FIG. 3 illustrates hot flow over an upper surface 16 of the tile 14 and cooling flow passing between the lower surface 18 of the tile 14 and the substructure skin 74.

Importantly, the post assembly 36 is specifically configured to allow relative sliding movement between the tile 14 and the substructure 72 along a plane which is generally parallel to the tile 14 upper and/or lower surfaces 16, 18. As can be seen in FIG. 4, shown is the tile 14 in a removed position relative to the substructure skin 74 as may be desired for inspection, access and maintenance to the substructure 72 and/or subsystems below the tile 14 and for inspection and or replacement of the tiles 14 themselves should the tiles 14 become damaged. The post assemblies 36 are shown disengaged from the substructure 72 with the arrows in FIG. 3 illustrating a direction along which the post assembly 36 may be re-engaged.

Figure 7:
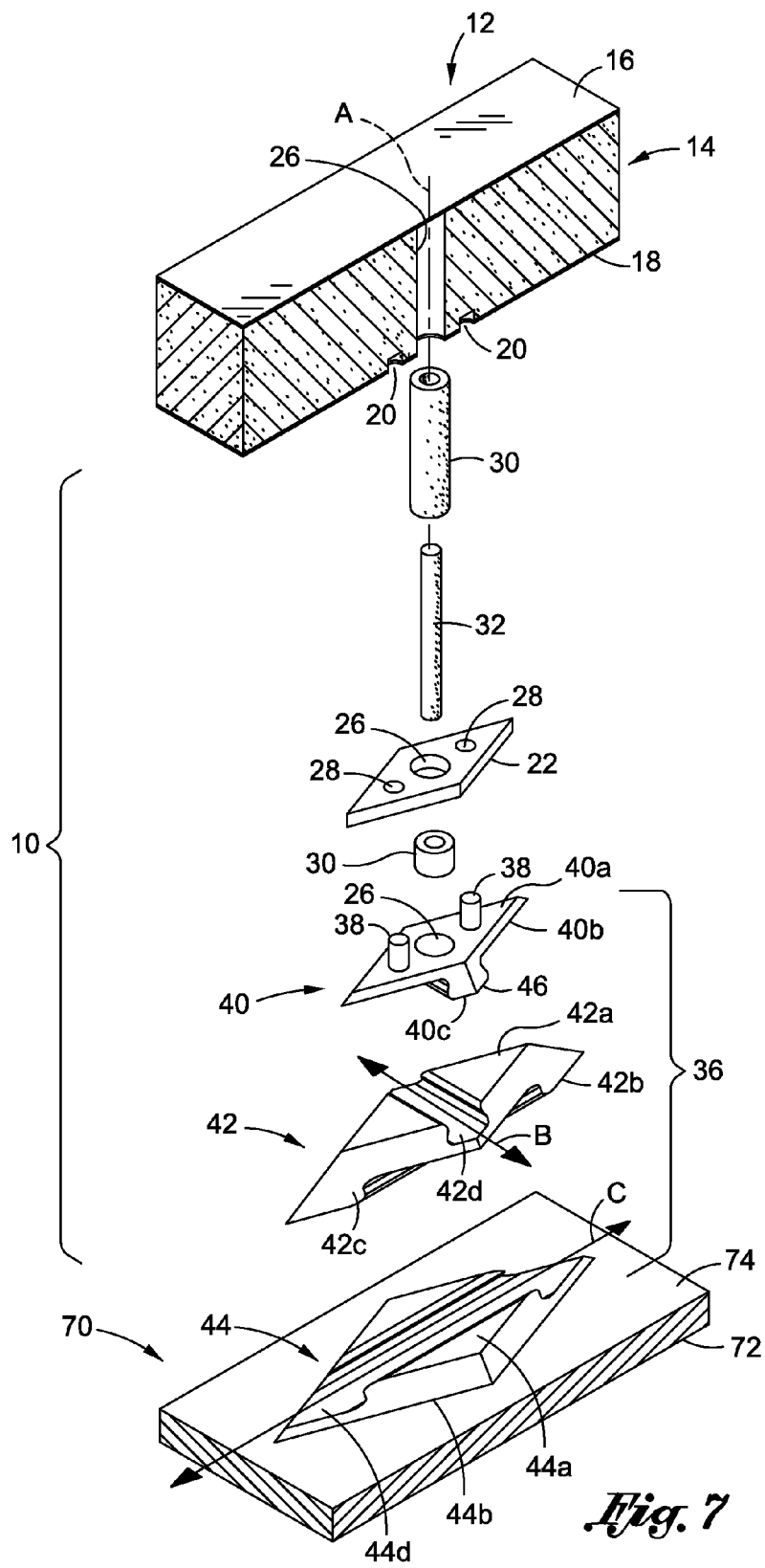
FIG. 7 is an exploded illustration of the TPS illustrating the interconnectivity of the post assembly, a strain isolation pad (SIP) and a cord.

Referring to FIG. 7, the post assembly 36 may be configured to allow relative movement between the tile 14 and the substructure 72 in at least one of first and second sliding directions B, C. As indicated above, the first sliding direction B may be oriented generally perpendicularly relative to the second sliding direction C as best seen in FIG. 7. However, the post assembly 36 may be configured to facilitate relative movement in only a single sliding direction or in three or more sliding directions. Furthermore, the first and second sliding directions B, C may be oriented in non-perpendicular relationship to one another.

Referring to FIGS. 3-4, the cooling gap 64 between the tiles 14 and the substructure 72 and, more particularly, between the lower surface 18 of the tile 14 and the substructure skin 74 is desirable in order to promote cooling flow therebetween. In particular, the cooling gap 64 between the tiles 14 and the substructure 72 is desirable in areas that are subject to high heat for prolonged periods of time such as directly behind an engine wherein the tiles 14 are subject to sustained impingement by the exhaust plume of an air breathing engine or a rocket engine. In this regard, the spaced relationship between the tile 14 and the substructure 72 as illustrated in FIGS. 3-4 facilitates cooling air flow which, in one example, can be passively generated or can be actively provided by pumping air from a compressor of a jet engine.

In addition, air may be forced through into the cooling gap 64 through the use of ejectors which direct air from a high pressure region of the aircraft/spacecraft into the cooling gap 64 between the tile 14 and the substructure 72. The cooling gap 64 between the tiles 14 and the substructure 72 permits the use of lower cost and lower temperature epoxy composite structures rather than the more expensive polyimide structures typically used in prior art structures wherein the TPS 12 is directly bonded to the substructure.

Referring now to FIGS. 5-7, shown is a partial cutaway view of the tile 14 illustrating the interconnectivity thereof to the post assembly 36. The post assembly 36 may be comprised of a lower element 44, a center element 42, and an upper element 40. The lower element 44 can be seen as being fixedly mountable to the substructure 72 of the vehicle 70. The center element 42 is preferably slidably engageable to the lower element 44. The upper element 40 is preferably fixedly mountable to the tile 14 and is slidably engageable to the center element 42.

Importantly, the upper element 40 is slidable relative to the center element 42 along the first sliding direction B. The center element 42 is preferably slidable relative to the lower element 44 along the second sliding direction C. In the exemplary embodiments illustrated in FIGS. 2-4, the first sliding direction B may be in alignment with the inboard/outboard direction of the vehicle 70. The second sliding direction C may preferably be generally oriented in alignment with the fore/aft direction of the vehicle 70.

In the exemplary embodiments of the attachment system 10 illustrated in FIGS. 2-11, the post assembly 36 may have a diamond shaped cross-section when the post assembly 36 is viewed along a post axis indicated by reference character A. The diamond shaped configuration of the post assembly 36 is a preferred embodiment and may facilitate a reduction in radar signature and an increase in load transfer capability as compared to a cylindrical configuration of the post assembly 36 shown in FIGS. 12-14 and as described in greater detail below. The diamond shaped configuration may therefore allow for a reduced cooling gap 64 between tile 14 and substructure 72. In addition, the diamond-shaped post assembly 36 may be tapered to a reduced cross-section from the lower element 44 toward the upper element 40. However, it should be noted that the post assembly 36 may be provided in any suitable size, shape and configuration other than the diamond shaped or cylindrically shaped configurations.

Referring to FIGS. 7-11, shown is the post assembly 36 which may comprise the lower element 44, the center element 42 and the upper element 40. The lower element 44 may preferably be bonded to the substructure 72 using any suitable adhesive 62 such as, without limitation, FM-680-1 film adhesive, commercially available from Cytec Industries Inc., West Patterson, N.J. However, other suitable adhesives may be used. Furthermore, it is contemplated that, in addition to or in conjunction with adhesives, the lower element 44 may be mechanically fastened to the substructure 72 using any suitable mechanical fastening technology.

As can be seen in FIG. 5, the lower element 44 comprises a slightly tapered configuration having a diamond shaped profile when viewed along the post axis A. In a preferable embodiment, the lower element 44 is flat or slightly curved complementary to the substructure 72 in order to facilitate a good adhesive bond between the lower side 44b of the lower element 44 and the substructure skin 74. In this regard, the attachment system 10 as described herein is preferably adapted for use on generally flat or planar surfaces or slightly curved surfaces although it is contemplated that the attachment system 10 may be applied to curved installations such as, without limitation, complex curved geometries.

It is also further contemplated that for installation of a large number of tiles 14 over a relatively large area, at least one of the tiles 14 may have a unique attachment mechanism that permits installation of the tile 14 without sliding into position and thereby prevents shifting of the installed tiles during use such as may occur as the result of static or dynamic loading. In this regard, shifting of the other tiles 14 may be prevented by the installation of a tile 14 that is installable without sliding into position. In this manner, a matrix of tiles 14 may be installed by first installing tiles 14 having the attachment system 10 described above followed by installing a single remaining tile 14 that may be locked into position with a non-sliding or otherwise unique attachment mechanism. In such an arrangement and for situations where a damaged tile 14 must be removed, the tile 14 with the unique attachment mechanism must be removed first prior to slidably disengaging the remaining tiles 14 from the substructure 72.

Referring to FIGS. 5-7, the attachment system 10 may include the center element 42 which is preferably provided with at least one interlocking mechanism 46. Importantly, the interlocking mechanism 46 is configured to allow sliding movement of the center element 42 relative to the upper and/or lower elements 40, 44 along at least one of the first and second sliding directions B, C. For example, as shown in FIG. 7, the center element 42 may include a groove 42d formed on an upper side 42a thereof with a tongue 44c being formed on a lower side 42b of the center element 42. Likewise, a corresponding groove 44d may be formed on an upper side 44a of the lower element 44 and a corresponding tongue 40c may be formed on the lower side 40b of the upper element 40.

The interlocking mechanism 46 (illustrated for exemplary purposes as the tongue and groove configuration) facilitates relative movement along the first and second sliding directions B, C which can be seen as being oriented generally perpendicular relative to one another. Furthermore, the tongue and groove configurations are sized and configured to provide a preferable non-interference fit at elevated operating temperatures. Importantly, the attachment system 10 facilitates sliding movement at such elevated operating temperatures to prevent failure of the joint due to binding as a result of thermal movement.

Figure 10:
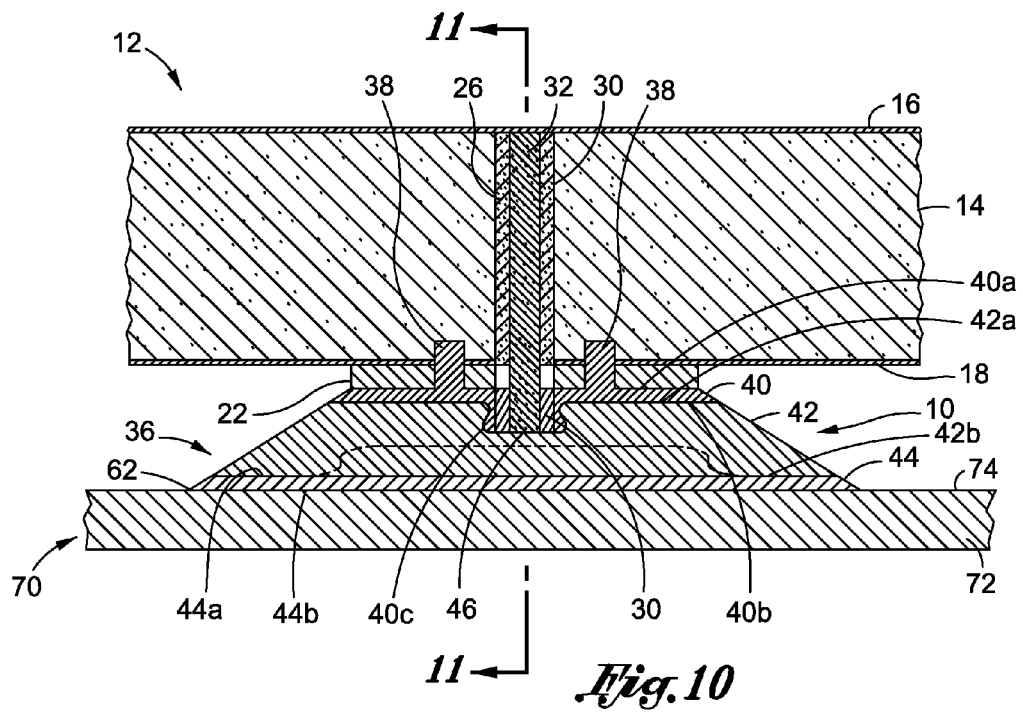
FIG. 10 is a sectional illustration of the tile mechanically attached to the substructure via the post assembly and illustrating the SIP installed between the upper element of the post assembly and the lower surface of the tile.
Figure 11:
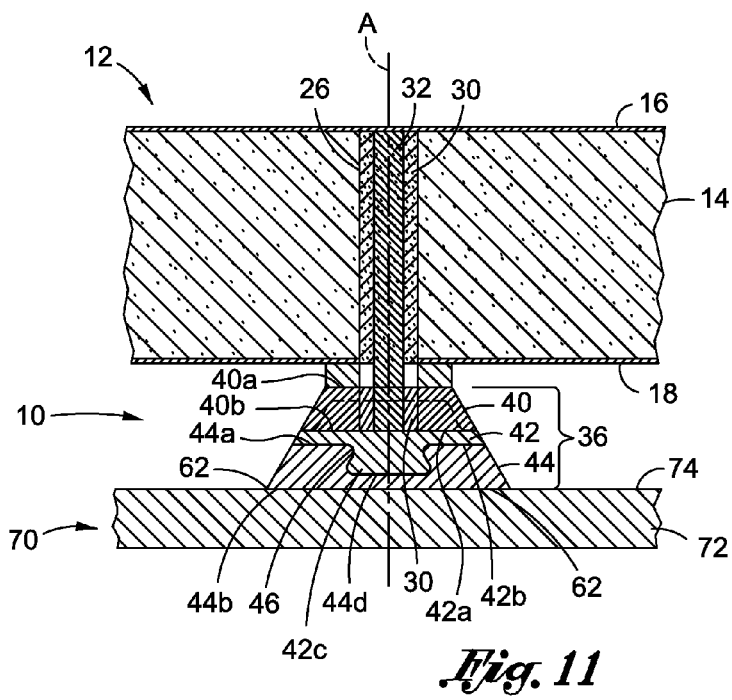
FIG. 11 is a sectional illustration taken along line 11-11 of FIG. 10 and illustrating a cross section of the attachment system in a direction transverse to the sectional illustration of FIG. 10.

Referring briefly to FIGS. 10 and 11, the interlocking mechanism 46 may be configured to prevent movement along a direction that is generally parallel to the post axis A (i.e., in the vertical direction). In this regard, the tongues 40c, 42c and the grooves 42d, 44d may be tapered into a dovetail configuration when viewed along a transverse cross-section. The dovetail configuration may prevent movement of the tile 14 in the axial direction (i.e., along the post axis A). It should also be noted that although the interlocking mechanism 46 is illustrated as being configured in the tongue and groove arrangement, the interlocking mechanism 46 may be provided in any variety of shapes, sizes and alternative configurations.

For example, it is contemplated that the interlocking mechanism 46 may comprise a lip element (not shown) which is configured to engage a complimentary shaped slot element (not shown) formed in any one of the lower, center and upper elements, 44, 42, 40. Furthermore, although the illustrated exemplary embodiments show the center element 42 as having a groove 42d on an upper side 42a thereof and a tongue 42c on a lower side 42b thereof, the center element 42 may be provided with a tongue formed on the upper side 42a and a groove formed on the lower side 42b to engage a complimentary shaped tongue and groove on the lower and upper elements 44, 40, respectively. Regardless of the specific configuration of the interlocking mechanism 46, the lower, center and upper elements, 44, 42, 40 are preferably configured to facilitate sliding movement along at least one of the first and sliding directions B, C while preventing relative movement along a direction parallel to the post axis A.

Referring to FIGS. 7-11, shown is the upper element 40 having at least one and, more preferably, a pair of prongs 38 extending upwardly from an upper side 40a of the upper element 40. The prongs 38 are preferably configured to extend into a matching set of counterbores 20 formed in an underside of the tile 14 as best seen in FIGS. 7 and 10. The prongs 38 are preferably provided in order to facilitate clocking alignment of the tile 14 relative to the upper element 40 and to facilitate lateral load transfer between the post assembly 36 and the tile 14. It should also be noted that although the upper element 40 is provided with a pair of prongs 38, any suitable feature having any configuration may be provided on the upper element 40 in order to facilitate alignment of the tile 14 with the upper element 40 and to facilitate lateral load transfer between the post assembly 36 and the tile 14 (i.e., generally along a plane that is parallel to the tile 14). In this regard, the lateral load transferring capability provided by the prongs 38 limits or prevents lateral or sideways movement of the tile 14 relative to the post assembly 36 under static or dynamic forces imposed on the tile 14 such as may occur during high-speed atmospheric flight.

Figure 9:
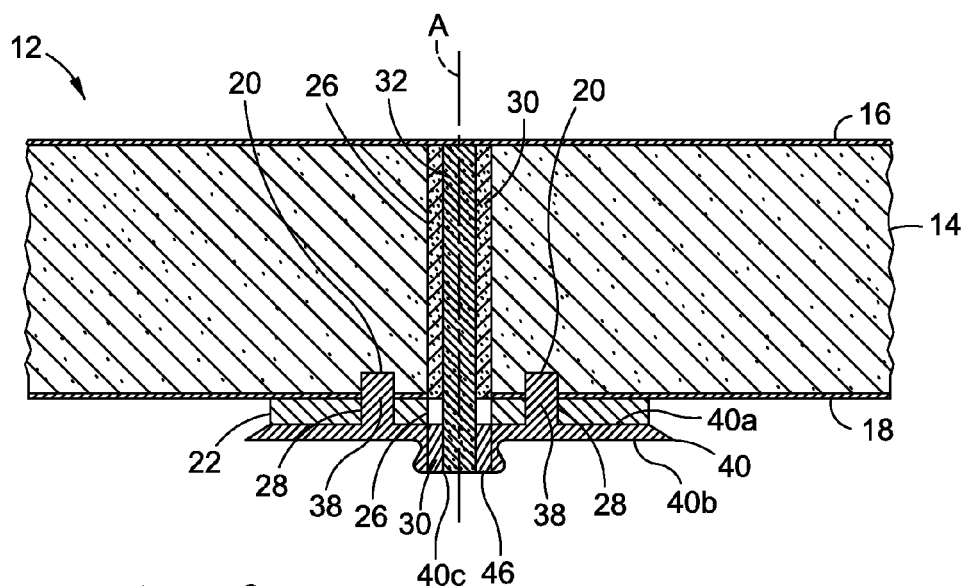
FIG. 9 is a sectional illustration of the tile and the upper element of the post assembly wherein a pair of prongs are engaged to the pair of counterbores formed in the lower surface of the tile.

Referring to FIGS. 9-11, the attachment system 10 preferably includes the strain isolation pad 22 (SIP) which is preferably interposed between the tile 14 and the post assembly 36. The SIP 22 is advantageously provided in order to facilitate relative movement between the tile 14 and substructure 72 as a result of air frame load-induced deformations. In this regard, the SIP 22 facilitates stress isolation of the tiles 14 in response to structural deflections, expansions and acoustic excitations and thereby prevents undesirable stresses in the tiles 14 as may otherwise occur without the attenuating effects of the SIP 22 in response to direct transfer of vertical loads between the tiles 14 and the substructure 72. In a preferred embodiment, the SIP 22 may be sandwiched between the upper element 40 and the lower surface 18 of the tile 14. However, it is contemplated that in certain embodiments it may be desirable to bond the SIP 22 to the upper element 40 using a suitable film adhesive. Likewise, the SIP 22 may be bonded to the lower surface 18 of the tile 14.

Vertical load transfer between the tile 14 and the post assembly 36 may be facilitated by at least one cord 32 which may extend substantially parallel to the post axis A and which interconnects the tile 14 to the post assembly 36 as shown in FIG. 7. The cord 32 is preferably configured to facilitate load transfer from the upper element 40 to the lower surface 18 of the tile 14. In this regard, the cord 32 may be bonded to the tile 14 wherein the cord 32 is inserted into a bore 26 formed through a thickness of the tile 14 as best seen in FIG. 7. In a preferable arrangement, the cord 32 may be provided in a inverted U-shaped loop extending through a pair of side-by-side bores 26 formed in the tile 14 and interconnected by a lateral groove (not shown) formed beneath an upper surface 16 of the tile 14. The lateral groove may be of a size and depth such that the cord 32 may nest therewithin. A plug (not shown) may optionally be installed such as by press-fitting into the upper surface 16 of the tile 14 with a lower end of the plug being placed in bearing contact with the cord 32 lying in the lateral groove to clamp the cord 32 therebetween with no adhesive being used to bond the cord 32 to the tile 14. The plug may be configured to lie flush with the upper surface 16 of the tile 14 such that an upper skin may be laid thereover. The lower ends of the U-shaped cord 32 may be secured to the upper element 40 such as by bonding.

The cord 32 may be fabricated of any suitable temperature-resistant material such as ceramic material. For example, the cord 32 may be fabricated of, without limitation, Nextel, silica, Nomex, or fiberglass rope or from other suitable materials appropriate for the temperatures at the location. The cord 32 may be potted into the tile 14 using a ceramic potting compound 30 such as a ceramic slurry. The potting compound 30 may be any suitable compound capable of high temperature environments. For example, the potting compound 30 may comprise ceramic potting. Upon insertion of the cord 32 into the bore 26 of the tile 14 and installation of potting compound 30, the potting compound 30 may be fired such as in an oven at the appropriate temperature in order to allow the potting compound 30 to bond the cord 32 to the tile 14.

The cord(s) 32 may be secured to the upper element 40 using a suitable potting compound 30 inserted into the annular space between the cord 32 and the bore 26 in the upper element. In this regard, a suitable polyimide potting compound 30 resin may be inserted between the cord 32 and the upper element 40 bore. The polyimide potting compound 30 resin may comprise, without limitation, AFR-PE4 microballoon-filled resin, commercially available from Maverick Corporation, Blue Ash, Ohio. Although the cord 32 is bonded to the upper element, the SIP 22 is preferably not bonded to the cord 32 in order to facilitate free movement between the upper element 40 and the ceramic tile 14 as may occur during acoustic excitation of the tile 14.

Figure 12:
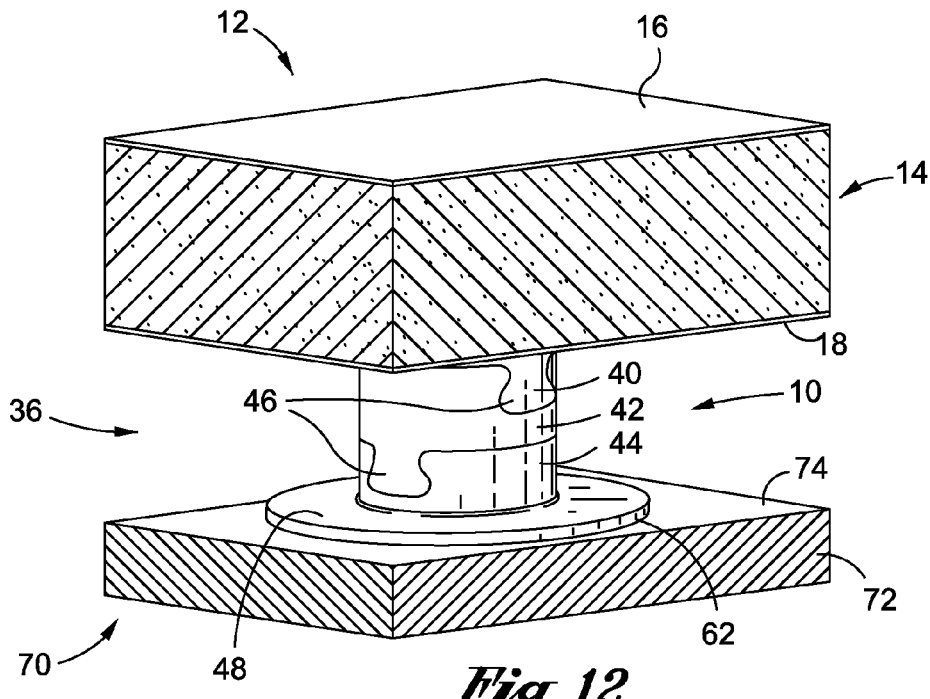
FIG. 12 is a perspective illustration of the tile mechanically attached to the substructure utilizing the post assembly having a cylindrical configuration.
Figure 13:
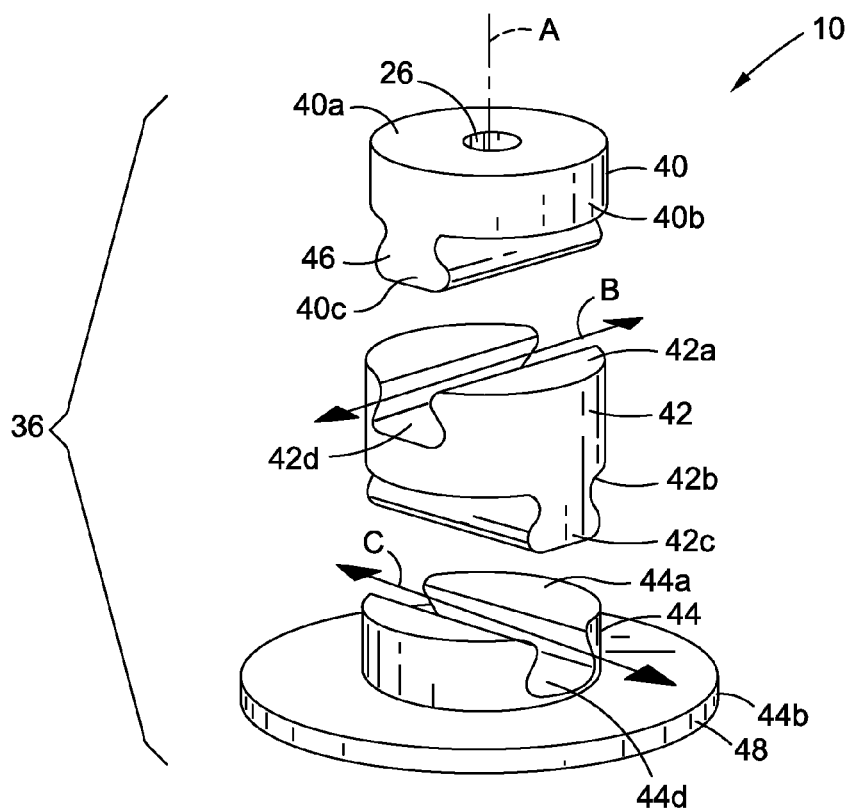
FIG. 13 is an exploded perspective illustration of the cylindrically shaped post assembly and illustrating a first sliding direction oriented in perpendicular relationship to a second sliding direction of the post assembly.
Figure 14:
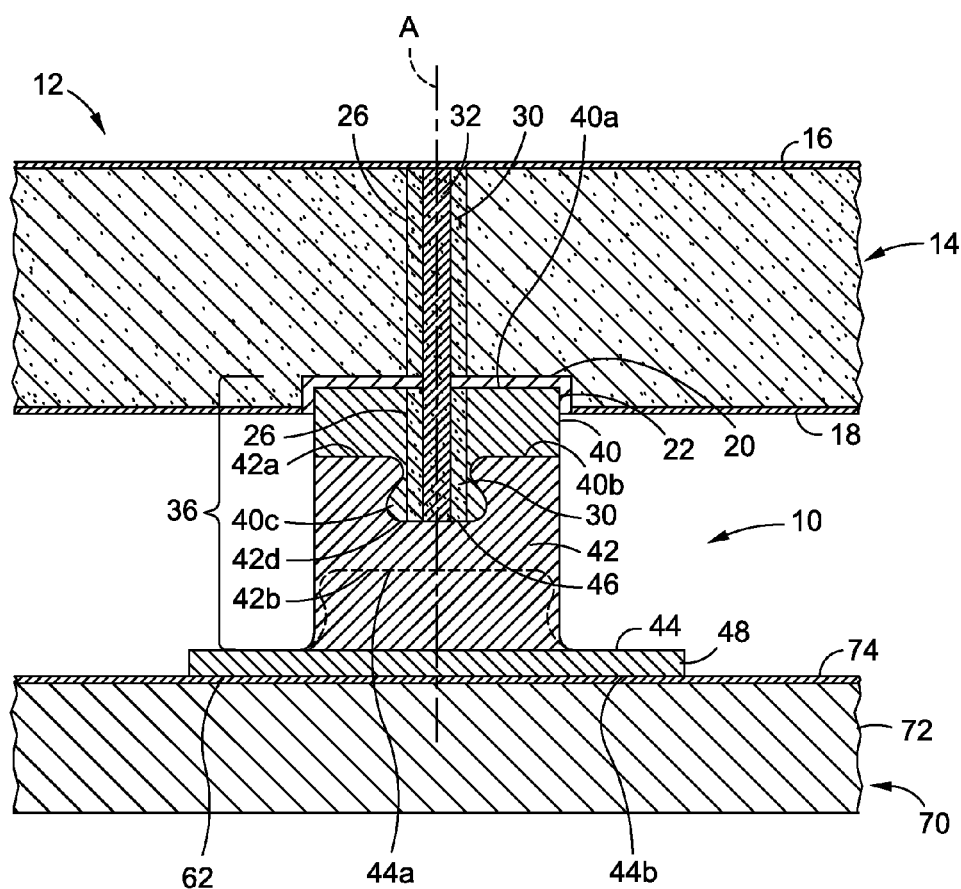
FIG. 14 is a sectional illustration of a cylindrically configured post assembly.
Figure 15:
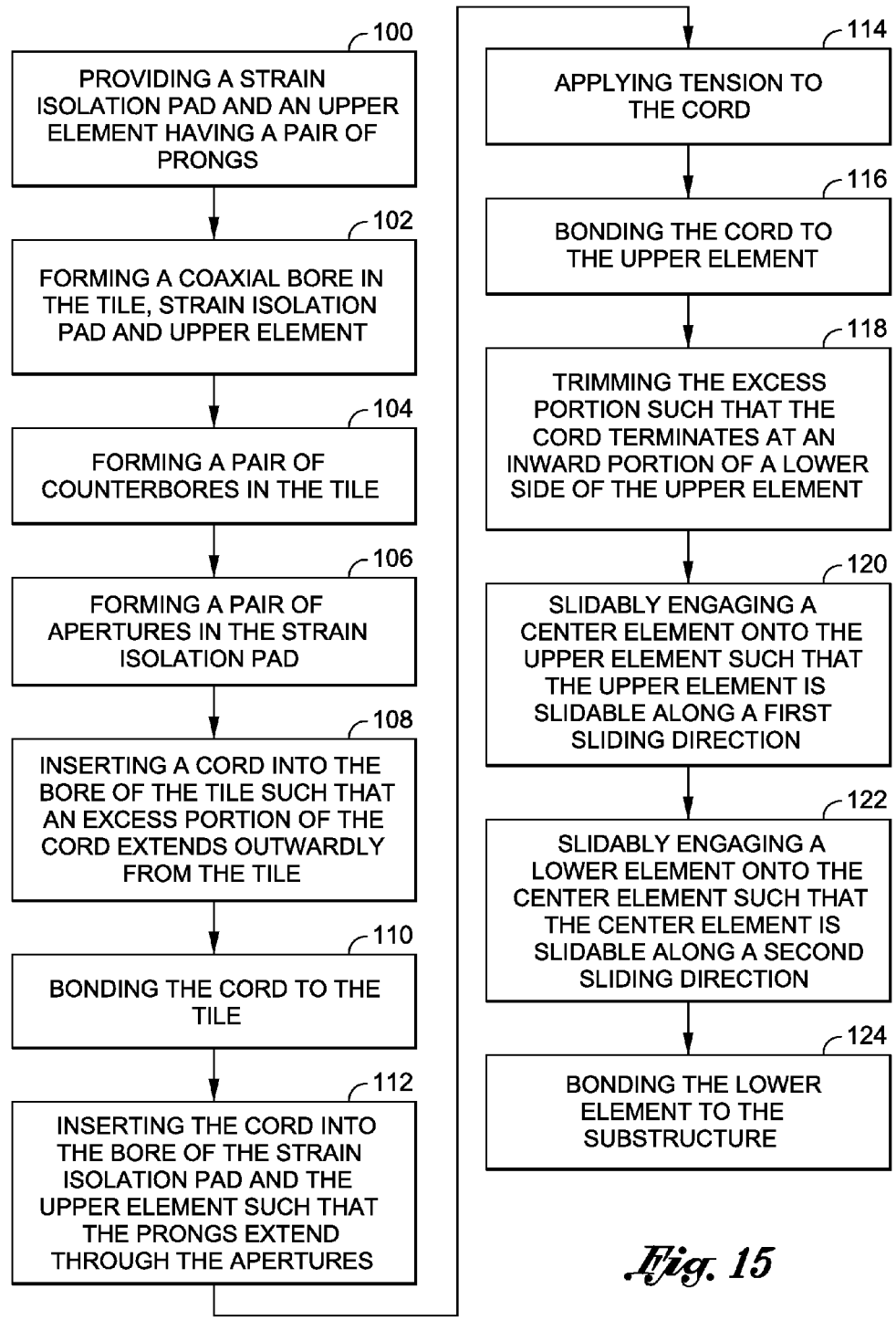
FIG. 15 is a flow chart of an exemplary process for fabricating the attachment system.
Figure 16:
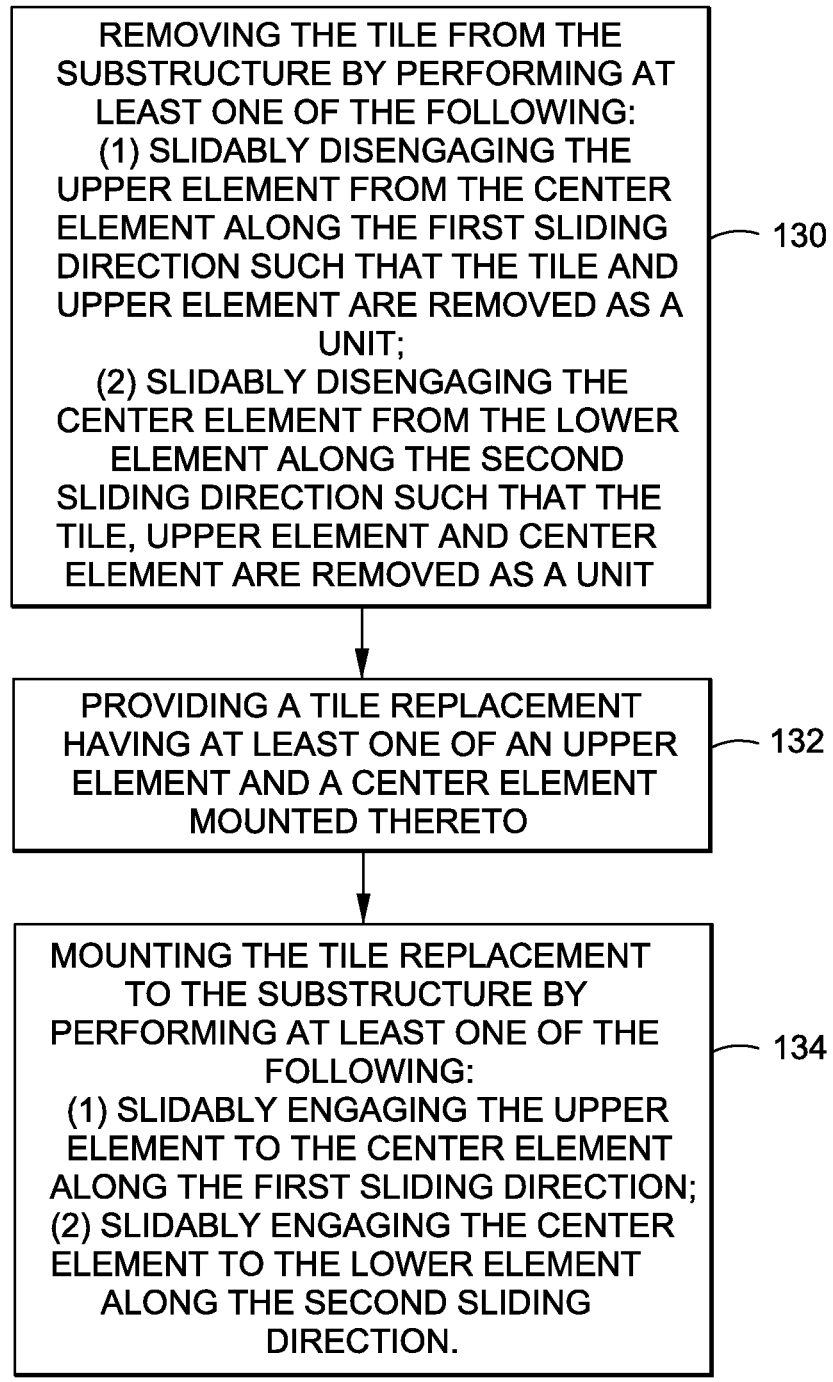
FIG. 16 is a flow chart of an exemplary process for removing the tile from the substructure.

Referring briefly to FIGS. 12-14, shown is the post assembly 36 in a cylindrical configuration. In the arrangement shown, the lower element 44, center element 42 and upper element 40 may be provided with a circular cross-section when viewed along the post axis A. As can be seen in FIG. 14, the spacing or cooling gap 64 between the tile 14 and the substructure 72 is relatively large as compared to the cooling gap 64 for the diamond shaped post assembly 36.

In addition, the cylindrically shaped lower element 44 may be provided with a flange 52 for greater surface area as best seen in FIGS. 12 and 13 to facilitate bonding to the substructure skin 74 with film adhesive. The upper element 40 may optionally be devoid of alignment features such as the prongs 38 illustrated in FIG. 7 although alignment features can be provided in multiples shapes and configurations in the cylindrical post assembly 36. In this regard, the cylindrical configuration of the post assembly 36 may be recessed into the tile 14 for transferring lateral loads between the tile 14 and the upper element 40 due to lack of such alignment features which can preferably be incorporated. In addition, recessing of the cylindrical configuration of the post assembly 36 into the tile 14 may facilitate positioning of the tile 14 relative to the post assembly 36. The addition of alignment features in the upper element 40 may facilitate clocking orientation of the tile 14 relative to the post assembly 36. Referring still to FIGS. 12-14, the lower, center and upper elements 44, 42, 40 may be provided with suitable interlocking mechanisms 46 such as the tongue and groove arrangement similar to that which is shown in FIGS. 5-11 for the diamond shaped post assembly 36.

Referring to FIGS. 8-11 and 15, a method of fabricating the attachment system 10 will now be described. As was indicated above, the attachment system 10 may be used for slidably mounting the tile 14 to a vehicle 70. The method may comprise step 100 of providing an SIP 22 and the upper element 40. The upper element 40 may preferably have at least one alignment feature such as the pair of cylindrically shaped prongs 38 extending upwardly from an upper side 40a of the upper element 40.

The pair of apertures 28 may be formed in the SIP 22 in step 106. The prongs 38 may be extended through the apertures 28 and may engage the complimentary shaped pair of counterbores 20 formed in the lower surface 18 of the tile 14 in step 104. The counterbores 20 are preferably cylindrically shaped in order to match the general cylindrical shape of the prongs 38. However, it should be noted that the alignment feature may be provided in a variety of alternative shapes, sizes and configurations other than the cylindrical shaped prongs 38 illustrated in the figures. The tile 14 may include a bore 26 which may be formed as a pair of bores 26 in step 102. The bore 26 in the tile 14 is preferably co-axially aligned with and sized complimentary to the bore 26 formed in the SIP 22 and the upper element 40.

Figure 8:
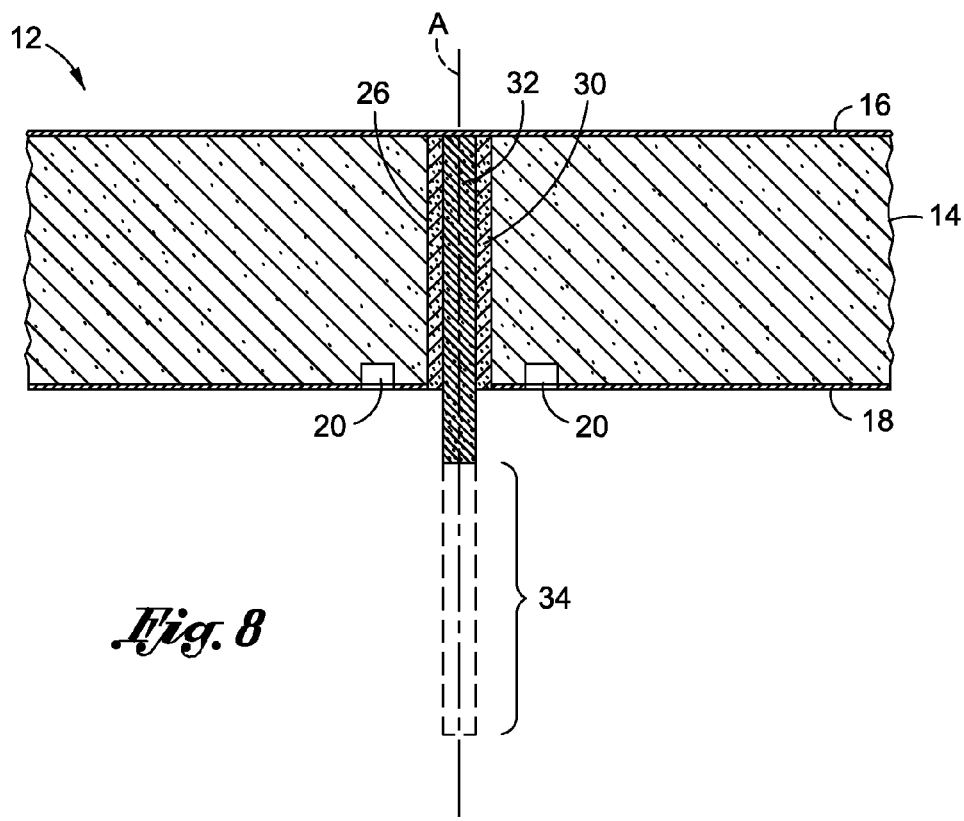
FIG. 8 is a partial cross-sectional illustration of the tile illustrating the bonding of the cord to a bore formed in the tile and illustrating a pair of counterbores formed in a lower surface of the tile.

In one embodiment of the assembly process, the cord 32 may be inserted into the bore 26 in step 108. The cord 32 may be of a smaller diameter than the bore 26 such that an annular gap may be provided between the bore 26 and the cord 32 to facilitate the insertion of the potting compound 30 for bonding the cord to the tile 14 in step 110. However, the cord 32 may be unbonded to the tile 14 using mechanical means (e.g., a plug) to clamp the cord 32 to the tile 14. The potting compound 30 may be installed and may be oven cured. Preferably, the cord 32 extends through the thickness of the tile 14 with an excess portion 34 of the cord 32 extending from the lower surface 18 of the tile 14 as best seen in FIG. 8. The SIP 22 and the upper element 40 may then be installed over the cord 32 in step 112 such that the cord 32 extends through the bores 26 formed in the SIP 22 and upper element. In step 112, the upper element 40 may be engaged against the SIP 22 and tile 14 such that the prongs 38 extend into the counterbores 20 formed in the lower surface 18 of the tile 14 as best seen in FIG. 9.

In step 114, tension is then applied to the cord 32 while the upper element 40 and the SIP 22 are forced against the tile 14 during bonding of the cord 32 to the upper element 40 with potting compound 30 in step 116. The potting compound 30 may be any suitable compound such as polyimide potting compound. Following curing (e.g., oven curing) of the potting compound 30 and the cord 32 may be placed under tension, the excess portion 34 may be trimmed in step 118 such that the cord 32 may terminate at an inward portion 64 of the lower side of the upper element 40.

In this regard, the free end of the cord 32 is preferably recessed into the upper element 40 in order to prevent interference with the sliding of the tongue 40c in the groove 42d of the center element 42. Following curing of the potting compound 30 and trimming of the excess portion 34 as shown in FIG. 9, the upper element 40 and tile 14 may be slidably engaged onto the center element 42 in step 120 such that the upper element 40 is slidable along the first sliding direction B but is non-movably fixed in a direction along the post axis A.

Likewise, the lower element 44 may then be slidably engaged onto the center element 42 in step 122 such that the center element 42 is slidable along the second sliding direction C as best seen in FIG. 7. Preferably, the interlocking mechanisms 46 formed on the upper, center and lower elements, 40, 42, 44 are such that relative movement in the axial direction (i.e., along the post axis A) is prevented. Following assembly of the post assembly 36, the lower element 44 may then be bonded to the substructure 72 in step 124 using a suitable adhesive 62 such as polyimide film adhesive.

Referring to FIGS. 5-7 and 16, a method of removing and installing a tile that is mounted to a vehicle substructure will now be described. As was earlier mentioned, it may be desirable to remove a tile 14 for a variety or reasons such as, for example, the case wherein the tile 14 is damaged and requires installation of a replacement tile 14. Furthermore, the tile 14 may require removal for the case wherein the inspection of the tile 14 and/or the substructure 72 is desired.

In step 130, tile 14 may be removed from the vehicle 70 substructure 72 by either slidably disengaging the upper element 40 from the center element 42 along the first sliding direction B such that the tile 14 and upper element 40 are removed as a unit leaving the lower element 44 fixedly mounted to the substructure 72, or, by slidably disengaging the center element 42 from the lower element 44 along the second sliding direction C such that the tile 14, upper element 40 and center element 42 are removed as a unit leaving the lower and center elements 44, 42 mounted to the substructure 72. Optionally, if an SIP 22 is provided between the tile 14 and the upper element 40, the SIP 22 will also be removed with the tile 14 as a unit.

Following removal of the tile 14, step 132 includes reinstalling the tile 14 as a unit. Alternatively, a tile 14 replacement may be provided wherein the tile 14 may include the upper element 40 which may be fixedly mounted thereto or the tile 14 may include both the upper element 40 and the center element 42 as appropriate depending upon whether the substructure 72 has a lower element 44 mounted thereon or the substructure 72 has both lower and center elements 44, 42 mounted thereon.

In step 134, the tile 14 may be installed by slidably engaging the upper element 40 to the center element 42 along the first sliding direction B, or, by slidably engaging the center element 42 to the lower element 44 along the second sliding direction C. As shown in FIG. 2, the tile 14 may include a plurality of post assemblies 36 such that removal and installation of the tile 14 may require slidable engagement of each of the upper elements 40 to the respective center elements 42 and/or slidable engagement of each of the center elements 42 to the respective lower elements 44 such that the upper, center and lower elements 40, 42, 44 of all the post assemblies 36 are slidably engaged to one another as shown in FIG. 3.

As was mentioned above, the interlocking mechanisms 46 which facilitate sliding engagement of the lower, center and upper elements 44, 42, 40 preferably comprise at least one of a longitudinally extending tongue 44c or a longitudinally extending groove 44d on the upper side 44a of the lower element 44. Likewise, a tongue 42c and groove 42d are preferably formed on opposing upper and lower sides 42a, 42b, of the center element 42 and a longitudinally extending tongue 40c on the lower side 40b of the upper element 40.

Following curing of the film adhesive 62 between the lower element 44 and the substructure skin 74, the tongue and groove features formed with the post assembly 36 facilitate sliding movement in at least one of the first and second sliding directions B, C as best seen in FIG. 7 for the diamond shape configuration and in FIG. 13 for the cylindrically shaped configuration of the post assembly 36. A preferable clearance between the tongue 40c, 42c and groove 42d, 44d is within the range of approximately 0.002 inches to 0.003 inches although any range of clearance between the tongue 40c, 42c and groove 42d, 44d of the upper, center and lower elements 40, 42, 44 of the post assembly 36 is suitable. The non-interference fit is preferably provided in order to prevent binding such as due to thermal expansion and/or structural bending at extreme operating temperatures.

Regarding materials from which the attachment system 10 may be fabricated, the upper element 40 may be fabricated from polybenzimidazole which is commercially available as Celazole PBI available from Celanese Advanced Materials, Charlotte, N.C. The Celazole PBI material as used in the upper element 40 is a preferable material due to its high temperature stability, strength, chemical resistance and non-flammability. The upper element 40 may be fabricated from such material using any suitable manufacturing process such as compression molding or injection molding. Likewise, the center element 42 may be fabricated from Celazole PBI due to its high compressive strength at elevated temperatures, superior wear resistance and high dimensional stability.

A preferable material from which the lower element 44 may be fabricated includes any suitable compression molded polyimide resin such as AFR-PE4. In this regard, AFR-PE4 is a suitable material when bonding to a polyimide substructure. AFR-PE4 has the capability to withstand long-term exposure to extreme temperatures and is thermally matched to the substructure 72 (i.e., compatible coefficient of thermal expansion) in order to minimize strain on the adhesive 62 bond joint. The post assembly 36 may also be fabricated of materials having favorable dielectric or radar reflectivity properties as may be desirable for military applications. However, it is contemplated that any metallic and/or non-metallic material or combination thereof may be used for fabricating the upper, center and lower elements 40, 42, 44 of the post assembly 36. The SIP 22 may be fabricated of any suitable flexible material having high temperature properties. For example, Nextel ceramic fiber pad may be utilized for fabricating the SIP 22. The ceramic rope or cord 32 may be fabricated likewise using Nextel or Nomex material.

The attachment system 10 as disclosed above provides a mechanism for mechanically attaching tile 14 of a thermal protection system 12 to an exterior surface of a substructure 72 such as of an air vehicle, a space vehicle or land-based vehicles and immobile structures and objects. Advantageously, the attachment system 10 facilitates quick and rapid inspection of installed tiles 14 and reduces maintenance touch labor and vehicle 70 downtime to repair and replace damaged tiles 14. In addition, the attachment system 10 provides a relatively large cooling channel or gap 64 between the lower surface 18 of the tile 14 and the substructure skin 74.

The cooling gap 64 improves cooling capacity and permits operation at much higher temperatures relative to prior art TPS installations wherein the tiles 14 are bonded directly to the substructure 72. Finally, the attachment system 10 provides a means for cooling capacity in order to facilitate use of lower cost and lower temperature epoxy composite structures for the substructure 72 underneath the tiles 14 in lieu of more expensive polyimide structures.

Furthermore, the attachment system 10 as disclosed above permits removal and replacement of tiles 14 in a drastically reduced amount of time as compared to the rather lengthy time period required for prior art direct bonding of tiles 14. In addition, the attachment system 10 permits higher propulsion exhaust temperatures over trailing structures due to cooling flow in the cooling gap 64 between the lower surface 18 of the tile 14 and the substructure skin 74. In this regard, the attachment system 10 provides a survivable solution for controlling extreme temperatures exhibited at locations in the exhaust path of an air breathing engine or rocket engine, particularly high thrust or after-burning engines on next generation military aircraft.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An attachment system for mounting a tile to a substructure, the attachment system comprising:
   at least one post assembly having a post axis and being configured to interconnect a tile to a substructure;
   the post assembly including a lower element, a center element, and an upper element being slidably engageable to one another and allowing relative translational sliding movement between each of the lower element, the center element and the upper element in non-parallel directions along a plane generally parallel to the tile; and
   a cord comprising a rope being configured to interconnect the tile to the upper element and transfer loads therebetween.

2. The attachment system of claim 1 wherein:
   the post assembly is configured such that the relative movement between the tile and the substructure occurs in at least one of first and second sliding directions; and
   the first sliding direction being generally perpendicular to the second sliding direction.

3. The attachment system of claim 2 wherein:
   the lower element is fixedly mountable to the substructure;
   the center element being slidably engageable to the lower element; and
   the upper element being fixedly mountable to the tile and slidably engageable to the center element;
   the upper element is slidable relative to the center element along the first sliding direction; and
   the center element being slidable relative to the lower element along the second sliding direction.

4. The attachment system of claim 3 wherein:
   the center element includes at least one interlocking mechanism configured to allow sliding movement of the center element relative to at least one of the lower and upper elements along at least one of the first and second sliding directions; and
   the interlocking mechanism being configured to prevent relative movement of the lower, center and upper elements along a direction generally parallel to the post axis.

5. The attachment system of claim 4 wherein the center element includes at least one of a longitudinally extending tongue and groove configured to slidably engage at least one of a corresponding groove and tongue mounted to at least one of the lower and upper elements.

6. The attachment system of claim 3 wherein the upper element includes at least one prong extending upwardly therefrom and being configured to engage the tile.

7. The attachment system of claim 1 wherein the post assembly is configured to mount the tile in spaced relation to the substructure.

8. The attachment system of claim 1 further comprising a strain isolation pad interposed between the post assembly and the tile.

9. The attachment system of claim 1 wherein the post assembly has at least one of a diamond shaped cross section and a circular cross section when viewed along the post axis.

10. The attachment system of claim 1 wherein the lower element is bonded to the substructure.

11. The attachment system of claim 1 wherein the cord is bonded to the tile and the upper element.

12. A vehicle having a substructure, the vehicle comprising:
    an attachment system configured to mount a tile to the substructure, the attachment system including:
      at least one post assembly interconnecting the tile to the substructure, the post assembly including a lower element, a center element, and an upper element being slidably engageable to one another and allowing relative translational sliding movement between each of the lower element, the center element and the upper element in non-parallel directions along a plane generally parallel to the tile; and
      a cord comprising a rope being configured to interconnect the tile to the upper element and transfer loads therebetween.

13. The vehicle of claim 12 further comprising a strain isolation pad interposed between the post assembly and the tile.

14. The vehicle of claim 12 wherein:
    the post assembly comprises:
      the lower element is fixedly mountable to the substructure;
      the center element being slidably engageable to the lower element; and
      the upper element being fixedly mountable to the tile and slidably engageable to the center element;
      the upper element is slidable relative to the center element along a first sliding direction; and
      the center element being slidable relative to the lower element along a second sliding direction.

15. The vehicle of claim 12 wherein:
    the cord is bonded to the tile and to the upper element; and
    the lower element being bonded to the substructure.

* * * * *